Nov. 5, 1957 E. P. AGHNIDES 2,812,031
VEHICLE WITH INCLINED HEMISPHEROIDAL WHEELS
Filed June 19, 1953 5 Sheets-Sheet 1

INVENTOR
Elie P. Aghnides
BY
ATTORNEY

Nov. 5, 1957  E. P. AGHNIDES  2,812,031
VEHICLE WITH INCLINED HEMISPHEROIDAL WHEELS
Filed June 19, 1953  5 Sheets-Sheet 3

INVENTOR
Elie P. Aghnides

ATTORNEY

Nov. 5, 1957  E. P. AGHNIDES  2,812,031
VEHICLE WITH INCLINED HEMISPHEROIDAL WHEELS
Filed June 19, 1953  5 Sheets-Sheet 4
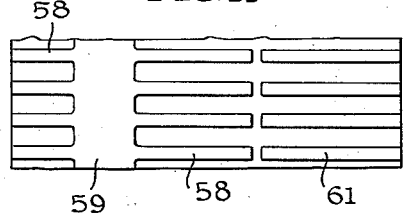
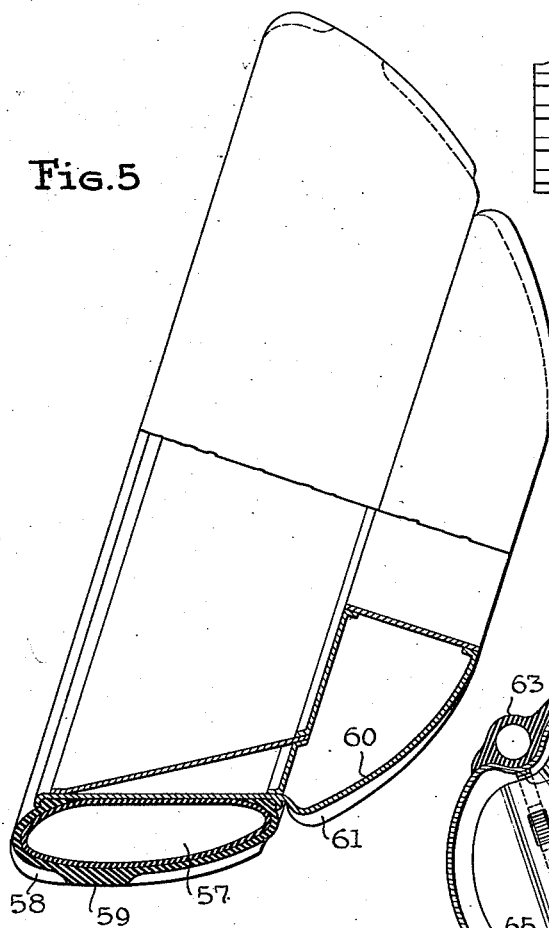
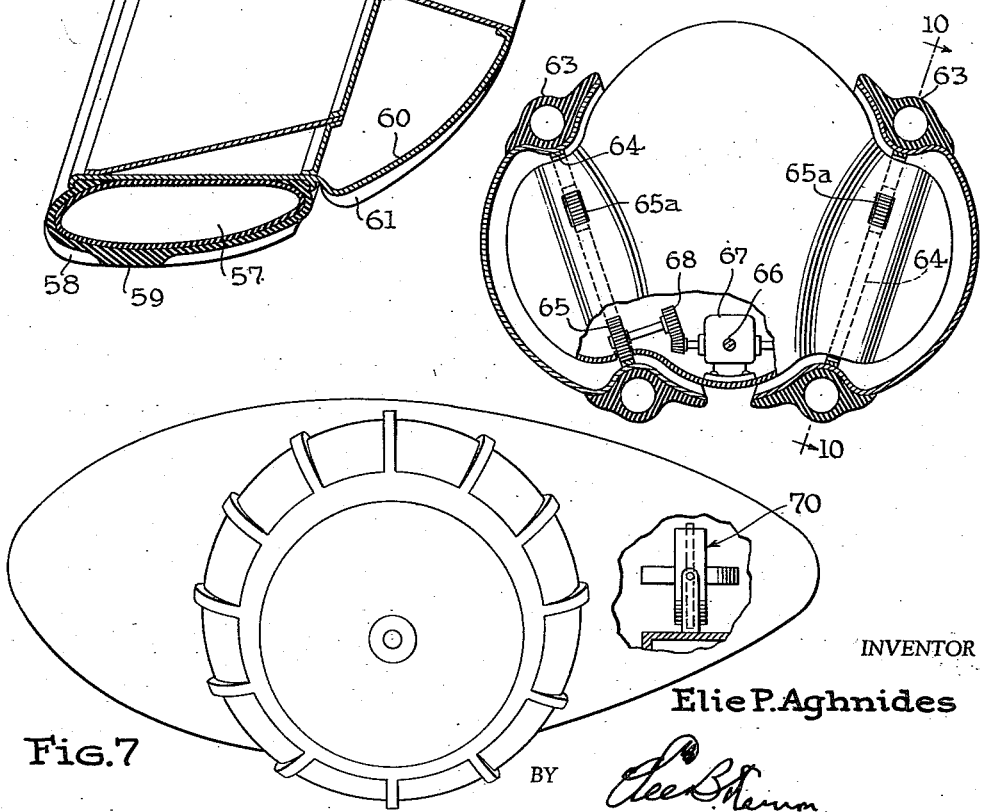
INVENTOR
Elie P. Aghnides
BY
ATTORNEY Nov. 5, 1957 E. P. AGHNIDES 2,812,031
VEHICLE WITH INCLINED HEMISPHEROIDAL WHEELS
Filed June 19, 1953 5 Sheets-Sheet 5

Jet propulsion

INVENTOR
Elie P. Aghnides
BY
ATTORNEY

United States Patent Office 2,812,031
Patented Nov. 5, 1957

2,812,031

VEHICLE WITH INCLINED HEMISPHEROIDAL WHEELS

Elie P. Aghnides, New York, N. Y.

Application June 19, 1953, Serial No. 362,700

15 Claims. (Cl. 180—27)

This application is a continuation-in-part of applicant's parent application, Serial No. 58,035, filed November 3, 1948, now abandoned.

This invention relates to a vehicle.

A vehicle having hemispheroidal wheels is described and claimed in Patent No. 2,372,043, granted to me on March 20, 1945. Reference is made to the aforesaid patent for a description of the primary advantages of a vehicle having generally hemispheroidal wheels, since these advantages are inherent in a vehicle embodying this invention. It is sufficient to state that the vehicle may be amphibious and is capable of operating over deep snow, soft mud, or sand with equal facility. The novel principles involved in this invention are of general vehicular application. Since these principles have particular advantages, however, as applied to a combat vehicle, the invention is illustrated and described with reference to such a vehicle.

A vehicle equipped with spheroidal wheels has more traction area and greater buoyancy than a vehicle equipped with conventionally disposed wheels. Spheroidal wheels, however, greatly increase the overall lateral dimension of a vehicle. Much of the above mentioned benefits of spheroidal wheels but without their attendant disadvantages may be obtained with this invention. Moreover, mounting hemispheroidal wheels in accordance with this invention lowers the center of gravity of the vehicle and at the same time permits an increase in the useful cubic content of the vehicular body. The invention increases the inherent mobility of the vehicle over difficult or soft terrain.

Accordingly, it is an object of this invention to provide a vehicle having wheels with substantially the same traction area as a vehicle having spheroidal wheels of like diameter but of lesser overall width than the latter vehicle.

It is another object of the invention to provide a vehicle with large hemispheroidal wheels, but with a lower center of gravity than has previously been konwn.

An additional object of the invention is to provide a vehicle with large hemispheroidal wheels that has a lower center of gravity than has been possible previously.

Still another object of the invention is to provide a vehicle with large hemispheroidal wheels that has improved operating characteristics.

It is a further object of this invention to provide means for increasing the inherent mobility of a vehicle having hemispheroidal wheels over difficult or soft terrain.

It is still another object of this invention to provide a vehicle with means for enabling the vehicle to turn about a center located midway between the span of the driving wheels.

It is still another object of this invention to provide a vehicle having large hemispheroidal wheels with an increase in the capacity of the vehicular body between the wheels.

The preferred form of the invention is a vehicle having a body whose width increases as the distance from the ground increases. On each side of the body there is a hemispheroidal wheel having its axis tilted outwardly and downwardly. The surface of the wheel may include raised treads in any suitable form including pneumatic tires, hard rubber ribs or cleats, etc. The vehicle preferably includes an engine that supplies driving torque to the tilted wheels. Further details of the invention will appear as this description proceeds.

Other features and advantages of the invention will be apparent from the following description and accompanying drawings in which:

Figure 5 is a sectional view of a modification of one of the wheels of the vehicle.

Figure 6 is a cross-sectional view of another modification of the body of the vehicle.

Figure 7 is a side view of a modified form of the invention with a portion of the body cut away.

Figure 11 is a developed view of a portion of the tread on the vehicle wheels as shown in Figure 5.

Figure 1:
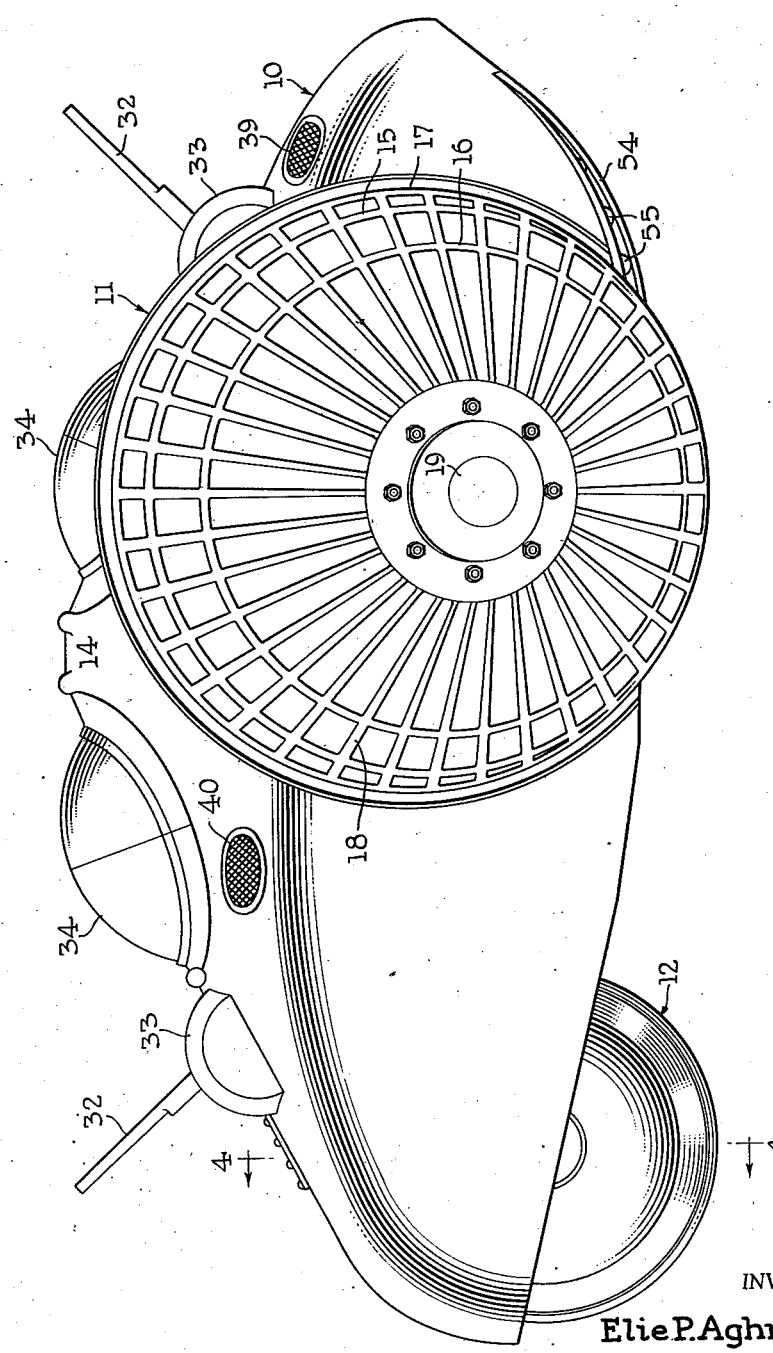
Figure 1 is a side elevational view of a vehicle embodying the invention.
Figure 2:
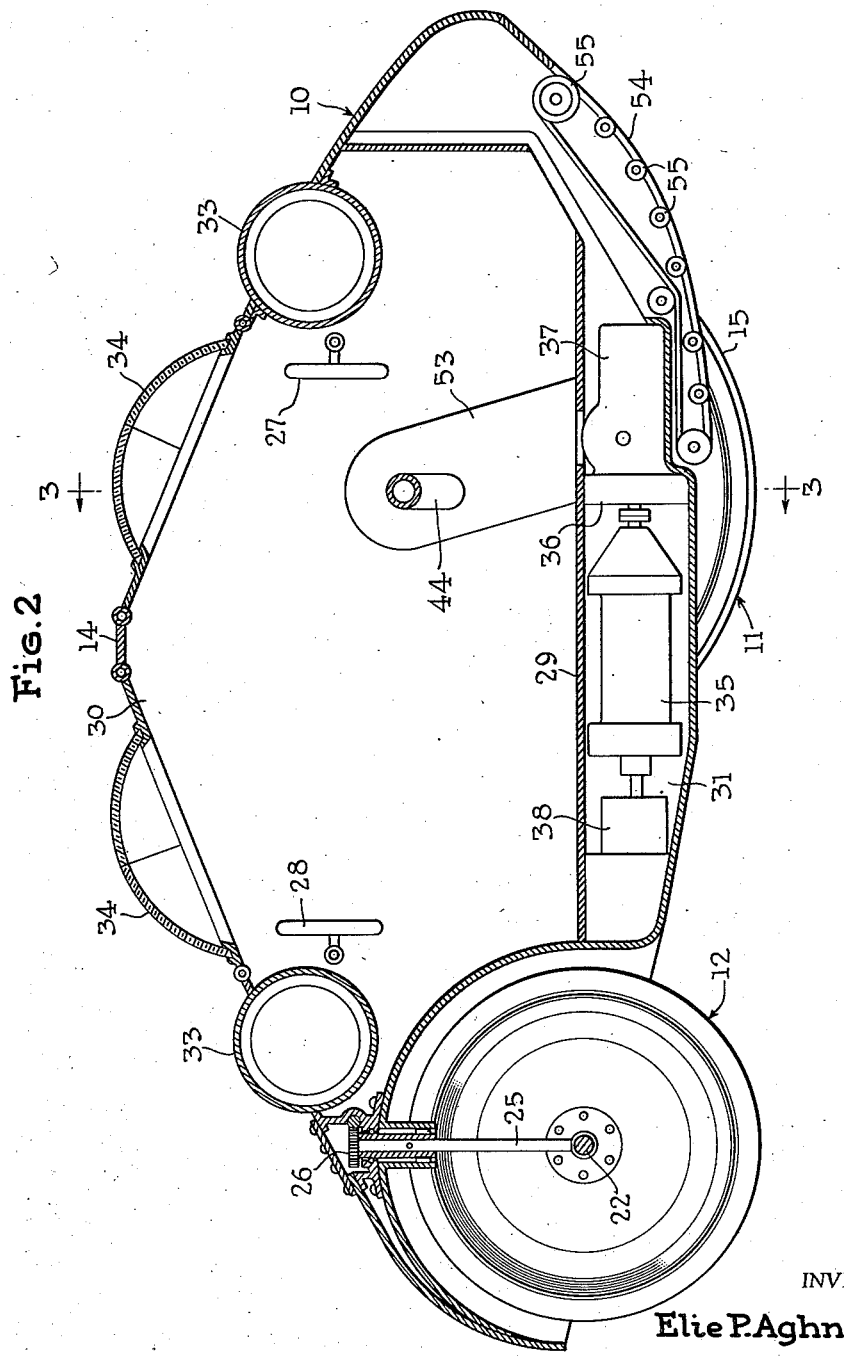
Figure 2 is a vertical sectional view of the vehicle shown in Figure 1.
Figure 3:
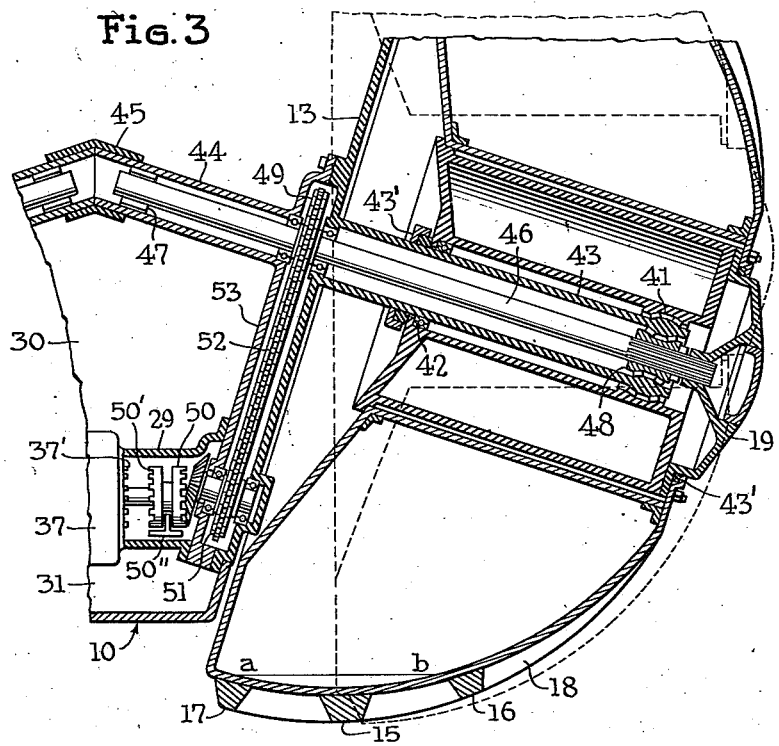
Figure 3 is a sectional view taken along line 3—3 of Figure 2.

Referring first to Figures 1 and 2 there is shown a vehicle embodying the features of this invention. An enclosed body 10, having missile deflecting curved surfaces, is provided with a pair of forwardly mounted propelling wheels 11, having a major diameter, substantially equal to the over-all height of the vehicle. The body also is provided with a single, rearwardly mounted, composite tail wheel 12, of smaller diameter than the propelling wheels 11. The body 10, or at least the lower portion thereof, preferably is of water-tight construction to make the vehicle amphibious, as later described. The propelling wheels 11 are generally hemispheroidal in shape having their apexes facing outwardly and their rotational axes inclined downwardly and outwardly in opposite directions, as best shown in Figures 3 and 5. Because of this inclination of their rotational axes, the wheels 11 present an increased area for engagement with soft terrain while at the same time the center of mass of the wheels, and consequently that of the entire vehicle is lowered. The increase in ground engaging area, due to wheel inclination, may readily be seen by referring to line a—b in Figure 3. Assuming the vehicle wheels 11 sink in soft terrain to the depth indicated by line a—b, the ground contacting area of the wheel, is greater than would be the case if the wheel was not tilted.

The above described wheel inclination admits of other advantageous results. It will be seen that although the lower portion of the body 10 is relatively narrow because of the reduced span between the wheels 11 at their point of ground contact, the upper portion of the body, which contains the most useful space, may be relatively wide, thereby increasing the useful cubic content of the body. Accordingly, the side walls 13 of the body diverge upwardly substantially parallel to and closely adjacent the inner substantially flat side or base of the wheels 11, as best shown in Figure 3. These side walls 13 preferably are connected by a transversely curved roof 14.

The propelling wheels 11 are constructed generally in accordance with those disclosed in the afore-mentioned patent, having a watertight, cellular or compartmental construction to preserve buoyancy in case one compartment is damaged to the extent of causing leakage. A raised primary tread 15, preferably of hard rubber or other suitable material, encircles each wheel; encircling raised secondary treads 16 and 17 also engage the ground when the vehicle is operated over soft or marshy terrain. It will be understood that any one or all of the wheel treads may be pneumatic instead of solid. The hemispheroidal surface of each wheel 11 also is provided with tread means in the form of raised ribs or cleats 18, preferably of hard rubber which radiate, from the apex or hub 19 of the wheel. These ribs 18 provide increased traction when the vehicle is operating over soft terrain and also serve as paddles to propel the vehicle when operated in water.

Figure 4:
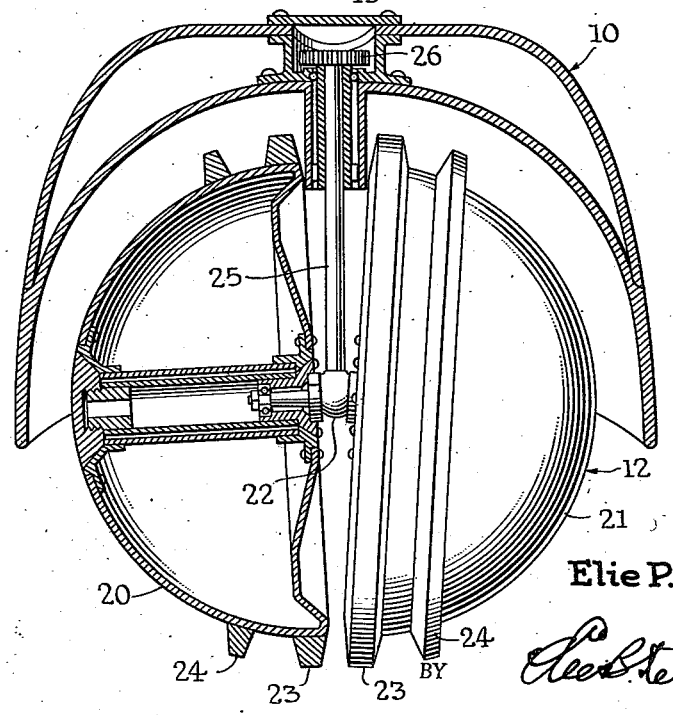
Figure 4 is a sectional view taken along line 4—4 of Figure 1.

The composite tail wheel 12 of the vehicle, shown best in Figure 4, consists of two wheel-like hemispheroidal elements 20 and 21 journalled on each end of a common axle 22. The axes of rotation of these elements 20 and 21 also are inclined downwardly and outwardly in opposite directions, though at a lesser angle from the horizontal than the axes of the propelling wheels 11. Each wheel-like element is provided with a raised primary rubber tread 23 encircling the marginal periphery of the element. A raised secondary rubber tread 24 is spaced axially from the primary tread 23 to also engage the ground when the vehicle is operated over soft terrain. These wheel treads may also be pneumatic, if desirable. The tail wheel elements 20 and 21 are also watertight and of compartmental construction, the treads 23 and 24 serving to some extent as rudders to aid in steering the vehicle when afloat. The axle 22 is secured to the lower end of a vertical steering column 25, the upper end of which is mounted on the body 10 for pivotal movement about a substantially vertical axis. A conventional rack and pinion 26 at the upper end of the steering column, operated by suitable mechanical means controlled by the steering wheel 27, may be employed for turning the tailwheel 12 to effect steerage of the vehicle. A supplemental steering wheel 28 may be provided for steeling the vehicle to the rear in case of emergency. Although the tailwheel 12 preferably is employed to steer the vehicle, this wheel may have a castor-like swivel mounting (not shown) and steerage of the vehicle effected by the propelling wheels 11 through conventional controlled differential means operated by the steering wheels 27 and 28. Preferably the vehicle is steered by both the tailwheel and controlling the differential speeds of the two wheels 11, as later described.

Referring now to Figure 2, it will be seen that the vehicle body is divided by a horizontal partition or flooring 29 into an upper and a lower compartment 30 and 31, respectively. The upper compartment 30 serves as a cabin for housing the operating personnel, controls, armament, etc. The armament may consist of automatic weapons 32 supported in conventional, drum type mountings 33. Hingedly mounted transparent canopies 34 preferably are incorporated in the cabin roof 14 both to provide visibility and to serve as access hatches. It is noted that steering wheel 27 is beneath the generally forward part of the forward hatch 34 and that steering wheel 28 is beneath the generally rearward part of the reach hatch 34. The lower compartment 31 houses an engine 35, preferably of flat design, a clutch 36, and a conventional combination transmission and differential 37. The engine 35 preferably is air cooled by a blower 38. Both cooling and combustion air is supplied to the engine through air scoops 39 located forwardly on the upper portion of the body 10 well above the water line. Outlet openings 40, located rearwardly on the body above the water line, serve to exhaust both used cooling air and the products of combustion of the engine. The location of the engine compartment 31 coupled with the inclination of the propelling wheels 11 results in an extremely low center of gravity for the entire vehicle.

The propelling wheels 11 are journalled for rotation on bearings 41 and 42 mounted on inclined hollow axles 43 having extensions 44, which extend within the body 10 as best shown in Figure 3. A watertight seal 43' is mounted on the axles 43 against the inner side of the wheels 11. When the vehicle is used in water these seals 43' prevent entrance of water not only into the wheel bearings 41 and 42 but also through the axles 43 into the vehicle body. The inner ends of each axle extension 44 are secured together, as at 45, for added structural strength. A separate drive shaft 46 is journalled on bearings 47 and 48 in each axle 43, the outer end of each shaft being connected to the outer end of the corresponding watertight wheel hub 19. A chain sprocket 49 is mounted on each drive shaft 46 inwardly of the corresponding side wall 13 of the vehicle body. Splined for slidable movement on the outer end of each power output shaft of the differential 37 is a gear 50 having bevel teeth which engage the gear teeth of a combination bevel gear and chain sprocket 51 mounted for rotation about an axis parallel to the drive shaft 46. A chain 51 connects the sprocket of the bevel gear 51 with the drive shaft chain sprocket 49. A housing 53 preferably encloses the chain 52 and the upper sprocket 49. Rigid suspensions for the wheels 11 and the tailwheel 12 are shown.

The effective turning radius of a vehicle, which is steered solely by turning the non-driving wheel or wheels, is limited to a great extent by the fact that the effective force exerted by the steered wheels to turn the vehicle decreases as the steering angle increases. A controlled differential overcomes this disadvantage and, by locking one driving wheel, enables a vehicle to pivot on the locked wheel. In this case the turning radius is equal to the span between the driving wheels. Turning may therefore be accomplished by braking one of the main wheels 11.

The turning radius may be reduced still further, however, and reach the optimum by the action of the gear 50. This gear is provided with clutch teeth 50' adapted to engage cooperating teeth 37' on the differential housing. Axial movement of the gear 50 by a lever 50" which rides in an annular groove, disengages the differential shaft from the chain sprocket 51 and locks this shaft against rotation. The corresponding wheel then may rotate freely. Under such conditions, if the tail wheel is turned to a 90° angle with the body and power applied to the differential, one wheel will drive the vehicle while the other rotates backward, thus spinning the vehicle about a center midway between the wheels 11.

Novel means are provided for preventing the vehicle from becoming mired in very soft terrain, in the event that the wheels sink therein to the extent of permitting the under surface of the body to contact the ground. The upwardly and forwardly sloping under surface of the vehicle between the driving wheels 11 is provided with an endless track 54, or several parallel tracks, not shown. The track 54 extends from a point substantially beneath the rotational axes of the wheels 11 to a point well forward thereof and relatively high on the vehicle body. The track 54 is supported on rollers 55, as shown, and may be driven from the engine transmission 37, if desired. In operation, the track, if not driven, substantially reduces the impeding effect of the body caused by frictional contact of the under surface thereof with soft terrain. If driven, the track 54 preferably is provided with convential cleats, not shown, to aid the wheels 11 in propelling the vehicle forward.

The rear portion of the body may project rearwardy of the wheels 12 and be provided with a tail wheel, as in the vehicle illustrated in Figures 1–4, or the rear body portion may also be confined within the lateral horizontal projection of the wheels. In the latter type of construction, pitching of the vehicle may be controlled by a small ground-contacting wheel or wheels secured to the body, as shown in the hereinbefore-mentioned patent.

Figure 5 illustrates a modified form of wheel having a pneumatic tire 57 and whose treads 58 and 59 normally constitute the rolling surface of the vehicle, but as the vehicle sinks into soft terrain the metallic wheel 60 with its treads or ribs 61 add to the rolling surface. The details of the treads of the wheel of Figure 5 are shown in Figure 11.

Figure 6 is a cross-section of the vehicle and illustrates hemispheroidal wheels equipped with pneumatic tires 63. The wheels have internal gears 64 driven by pinions 65. The power from drive shaft 66 operates differential gear system 67 which drives pinion 65 through gears 68.

Figure 7 illustrates a modified form of the invention in which the rear wheel is replaced with a gyroscope 70 which will maintain the vehicle level as more fully described in my said prior U. S. Patent 2,372,043.

Figure 8:
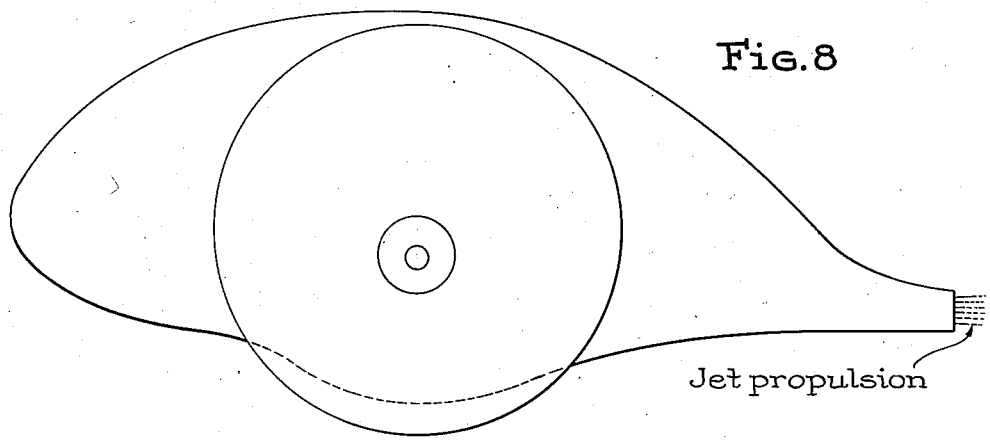
Figure 8 is a side view of still another modification showing certain features in more detail.

Figure 8 shows the jet propulsion apparatus of the vehicle while the latter is operating in water. A water pump in the vehicle projects a stream of water rearwardly to propel the vehicle in a forward direction. On land, braking one wheel or the other will permit steering but other means for steering may be used.

Figure 9:
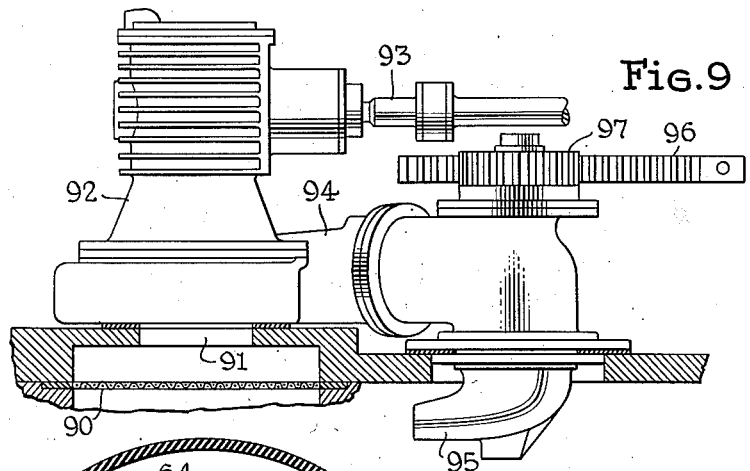
Figure 9 illustrates the water pump and nozzle used with the invention illustrated in Figure 8.

Figure 9 illustrates the pump arrangement for use with the jet propulsion. Water from the sea, lake, river or other body of water in which the vehicle is operating enters through screen 90 to inlet 91 of the pump 92. The pump is driven by main drive shaft 93. Water under pressure enters pipe 94 and leaves through nozzle 95 at the extreme rear of the vehicle. Nozzle 95 may be rotated by means of a rack 96 and pinion 97 whereby the direction of the forward force may be modified to thus control the direction of travel of the vehicle.

Figure 10:
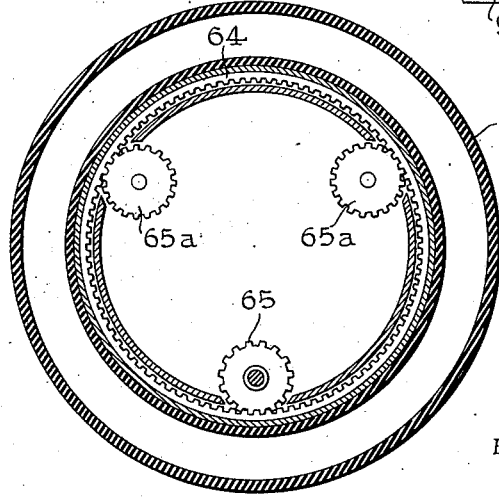
Figure 10 is a sectional view along line 10—10 of Figure 6.

Figure 10 illustrates certain details of Figure 6. The pneumatic tire 63 is mounted on ring 64 having an internal gear which meshes with three pinions that are mounted on shafts that are fixed to the body of the vehicle. Pinion 65 drives the geared ring 64 while gear wheels 65a merely hold the geared ring 64 in operating position.

I claim:

1. A vehicle comprising a structure, load-carrying ground-engaging wheels disposed respectively on opposite sides of said vehicle, means mounting said wheels on said structure and maintaining the axes of rotation of the wheels pointing outwardly and downwardly thereby placing the lower inner ends of the wheels under the vehicle structure to at least partially shield the lower portion of said vehicle structure, each said wheel having a maximum thickness which approximates the radius of the wheel and also having a generally decreasing diameter, perpendicular to the axis of rotation, as the distance from the vehicle structure increases to thereby provide a large ground-contacting surface thereof as well as a stable vehicle.

2. A vehicle as defined in claim 1 in which the wheels are generally hemispheroidal.

3. A vehicle as defined in claim 1 in which the vehicle structure comprises a body, the wheels having a diameter approximately equal to the height of the vehicle body.

4. A vehicle as defined in claim 1 in which the vehicle structure has side walls that generally diverge as their distance above ground increases and the inner face of each wheel being adjacent to its complementary outer side wall of the vehicle structure.

5. A vehicle as defined in claim 1, comprising a body, said body having a side wall which projects into the region surrounded by the surface of at least one of the wheels.

6. A vehicle comprising a vehicle structure, traction and load-carrying wheels disposed respectively on opposite sides thereof, means for supplying traction torque to each wheel and for mounting each wheel about an axis inclined outwardly and downwardly, siad last named means including a driving element rotatable about said axis and connected to the wheel for rotating the latter about its axis, and engine means for applying torque to said driving elements thereby to rotate the wheels, said wheels each having a rolling ground-contacting surface of generally decreasing wheel diameter as the distance from the vehicle structure increases.

7. A vehicle as defined in claim 6 in which the wheels are generally hemispheroidal.

8. A vehicle as defined in claim 6 in which said driving element includes an internal gear around the inside surface of the wheel and a pinion for driving said internal gear.

9. A vehicle having a vehicle structure and load-carrying rolling ground-contacting wheels disposed respectively on opposite sides of the vehicle, said structure including means maintaining the wheels with their axes pointing normally outwardly and downwardly with the inner lower ends of the wheels closer together than the inner upper ends, said wheels comprising a ring-shaped rolling portion and also including an extended rolling surface adjacent the said ring-shaped portion and extending away from the outer part of said portion with a generally decreasing diameter measured in planes perpendicular to the axis of rotation and which will provide a stable vehicle and on sinkage of the vehicle will contact the ground and limit the sinkage.

10. A vehicle comprising a structure, load-carrying ground-engaging wheels disposed respectively on opposite sides of said vehicle, means mounting said wheels on said structure and maintaining the axes of the wheels normally pointing outwardly and downwardly thereby placing the lower inner ends of the wheels under the structure to at least partially shield said structure, each said wheel having sufficient thickness in planes parallel to its axis that it may contact the ground below the point where the plane of the inner edge of the wheel intersects the axis of rotation, each wheel including a tire the outer surface of which has a generally progressively decreasing diameter over a substantial part thereof as the distance from the vehicle increases.

11. A vehicle comprising a structure, load-carrying ground-engaging wheels disposed respectively on opposite sides of said vehicle, means mounting said wheels on said structure and maintaining the axes of the wheels pointing outwardly and downwardly thereby placing the lower inner ends of the wheels under the vehicle structure to at least partially shield said structure, each said wheel having sufficient thickness that it may contact the ground vertically below the point where the plane of the inner edge of the wheel intersects the axis of rotation and having a frame therein for transmitting the load from the vehicle to the outer surface of the wheel, the wheel having a generally enclosed hollow space surrounding the frame.

12. A vehicle comprising a body, load-carrying ground-engaging wheels for said vehicle respectively located on opposite sides of the body, means mounting said wheels on said body and maintaining the axes of the wheels pointing outwardly and downwardly thereby placing the lower edges of the wheels under the body to at least partially shield it, said last named means including for each wheel means extending through the side wall of the body and including a driving element rotatable about the axis of the wheel and connected to the wheel for rotating the latter about its axis, and an engine located in the body for applying torque to said driving elements to thereby rotate the wheels, each said wheel having a maximum thickness which approximates the radius of the wheel and also having a generally decreasing diameter, perpendicular to the axis of rotation, as the distance from the vehicle structure increases to thereby provide a large ground-contacting surface thereof as well as a stable vehicle.

13. In a vehicle comprising a body, means for driving the vehicle including load-carrying ground-engaging wheels for the vehicle respectively located on opposite sides of the body, means connected to each side wall of the body for mounting one of said wheels on said body and maintaining the axis of the wheel pointing outwardly and downwardly thereby placing the lower inner end of each wheel under the body to at least partially shield the latter, each said wheel having a diameter approximately equal to the overall height of the body with the axis of each wheel intersecting the side wall of the body, each wheel having a generally decreasing diameter as the distance from the body increases and extending away from the body so far that it has a portion adjacent the ground at the point on the latter vertically below the point where the axis of the wheel intersects the plane of the inner edge of the wheel.

14. A vehicle comprising a structure, load-carrying ground-engaging wheels disposed respectively on opposite sides of said vehicle, means mounting said wheels on said structure and maintaining the axes of the wheels pointing outwardly and downwardly thereby placing the lower inner ends of the wheels under the vehicle structure to at least partially shield the lower portion of said vehicle structure, each said wheel having a generally decreasing diameter as the distance from the vehicle structure increases and the outer surface of the wheel extending at least to the point on the ground vertically beneath the intersection of the plane of the inner edge of the wheel with the axis thereof, each wheel also having a raised tread portion.

15. A vehicle as defined by claim 14 in which the raised tread portion is immediately adjacent the inner edge of the wheel.

References Cited in the file of this patent

UNITED STATES PATENTS

| | | |
|---|---|---|
| 594,027 | Loebs | Nov. 23, 1897 |
| 1,203,506 | Doty | Oct. 31, 1916 |
| 1,572,531 | Henkel | Feb. 9, 1926 |
| 2,207,780 | Brown | July 16, 1940 |
| 2,350,593 | Cuningham | June 6, 1944 |
| 2,372,043 | Aghnides | Mar. 20, 1945 |
| 2,432,107 | Williams | Dec. 9, 1947 |
| 2,448,222 | Jones | Aug. 31, 1948 |
| 2,488,310 | Mayer | Nov. 15, 1949 |

FOREIGN PATENTS

| | | |
|---|---|---|
| 3,094 of 1881 | Great Britain | July 15, 1881 |
| 604,812 | France | Feb. 6, 1926 |
| 617,260 | France | Nov. 19, 1926 |
| 708,005 | Germany | July 9, 1941 |
| 416,826 | Italy | Dec. 16, 1946 |

OTHER REFERENCES

"Water Jet Propels Boats"; "Popular Science," February 1950, pp. 128, 129.

"Water Jet Propels Boat"; "Popular Mechanics," April 1953, p. 123.